(12) United States Patent
Gallagher et al.

(10) Patent No.: US 10,759,254 B1
(45) Date of Patent: Sep. 1, 2020

(54) VEHICLE AIR-EXTRACTION APPARATUS

(71) Applicant: Ford Global Technologies, LLC, Dearborn, MI (US)

(72) Inventors: Steve William Gallagher, Bloomfield Hills, MI (US); Michael Murphy McElroy, South Lyon, MI (US); Musheeruddin Syed, Farmington Hills, MI (US); Eric R. Yerke, Redford, MI (US); Mukdam Kena, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/284,090

(22) Filed: Feb. 25, 2019

(51) Int. Cl.
| | |
|---|---|
| B62D 25/04 | (2006.01) |
| B62D 33/023 | (2006.01) |
| B60H 1/26 | (2006.01) |
| B60H 1/00 | (2006.01) |
| B60H 1/24 | (2006.01) |
| B62D 29/04 | (2006.01) |

(52) U.S. Cl.
CPC ......... *B60H 1/00564* (2013.01); *B60H 1/243* (2013.01); *B60H 1/244* (2013.01); *B62D 29/043* (2013.01)

(58) Field of Classification Search
CPC .. B62D 25/04; B62D 33/023; B60H 1/00014; B60H 1/0055; B60H 1/00564; B60H 1/243; B60H 1/244

USPC ...... 296/208, 193.06, 183.1, 190.09; 454/70, 454/162, 164, 165

See application file for complete search history.

(56) References Cited

U.S. PATENT DOCUMENTS

| | | | |
|---|---|---|---|
| 5,695,397 A | 12/1997 | Frank et al. | |
| 10,093,150 B2 * | 10/2018 | Waldner | B60H 1/00564 |
| 2015/0343965 A1 * | 12/2015 | Rowland | B60R 13/02 |
| | | | 454/165 |
| 2016/0221611 A1 | 8/2016 | Wolf et al. | |
| 2020/0079175 A1 * | 3/2020 | Fiocchi | B60H 1/00564 |

FOREIGN PATENT DOCUMENTS

| | | |
|---|---|---|
| DE | 102010048863 A1 | 4/2012 |
| EP | 1075972 B1 | 10/2003 |
| EP | 1762468 B1 | 12/2009 |
| GB | 1441429 | 11/1973 |

* cited by examiner

*Primary Examiner* — Dennis H Pedder
(74) *Attorney, Agent, or Firm* — David Coppiellie; Bejin Bieneman PLC

(57) ABSTRACT

A vehicle body includes a cabin portion, a bed portion, and an air extractor. The cabin portion defines a passenger cabin and includes a hollow pillar having an opening to the passenger cabin. The bed portion defines a bed and includes a hollow frame rail elongated from the pillar. The pillar and the frame rail define an airflow path from the opening. The air extractor is positioned in the frame rail and is in communication with the airflow path and an ambient environment.

19 Claims, 5 Drawing Sheets

VEHICLE AIR-EXTRACTION APPARATUS

BACKGROUND

Vehicles include passenger cabins to house occupants, if any, of the vehicle. Passenger cabins include one or more front seats disposed at a front of the passenger cabin and one or more back seats disposed behind the front seats. Passenger cabins may also include third-row seats at a rear of the passenger cabin. Vehicles with enclosed passenger cabins typically include air extractors, which permit air to exit the passenger cabin to the ambient environment when the air pressure within the passenger cabin increases.

DETAILED DESCRIPTION

Figure 1:
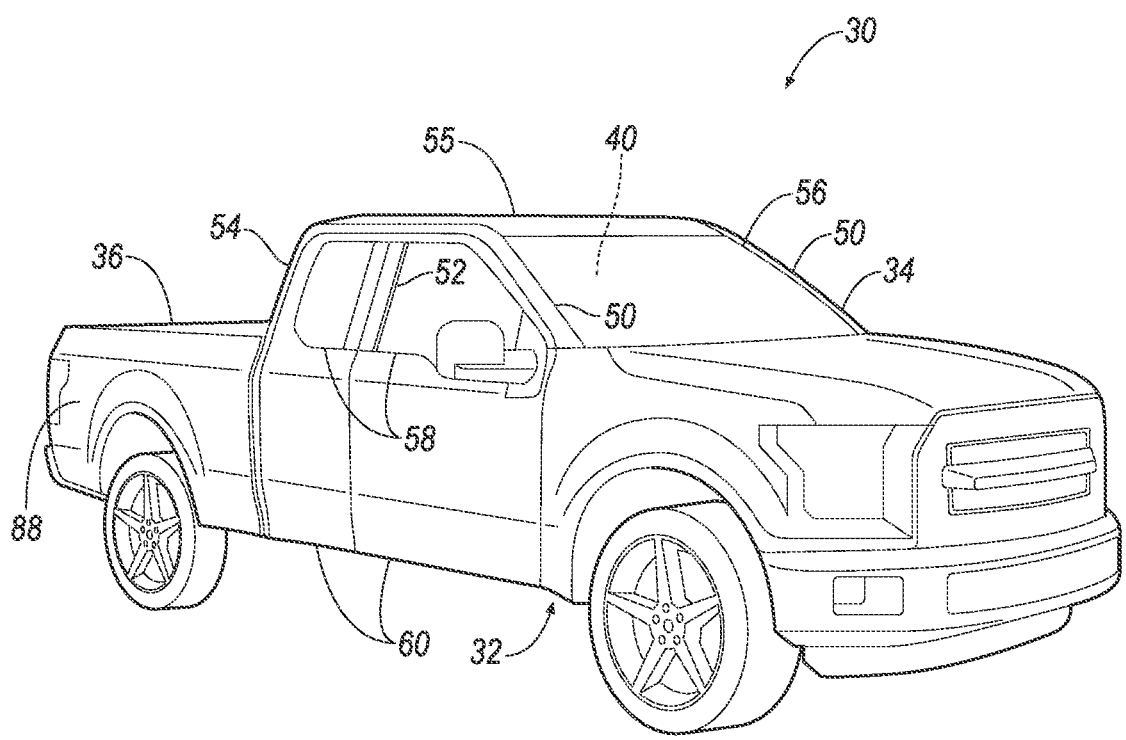
FIG. 1 is a perspective view of a vehicle.

A vehicle body includes a cabin portion defining a passenger cabin and including a hollow pillar having an opening to the passenger cabin, a bed portion defining a bed and including a hollow frame rail elongated from the pillar, and an air extractor positioned in the frame rail. The pillar and the frame rail define an airflow path from the opening. The air extractor is in communication with the airflow path and an ambient environment.

The frame rail may be elongated horizontally rearward from the pillar.

The pillar may be elongated from a bottom end to a top end, and the frame rail may be spaced from the bottom end and from the top end.

The vehicle body may further include a baffle positioned inside the pillar on an opposite side of the frame rail from the opening. The baffle may be arranged to block airflow through the pillar.

The baffle may be a first baffle, the vehicle body may further comprising a second baffle positioned inside the pillar, and the opening may be between the first baffle and the second baffle. The first baffle and the second baffle may be each arranged to block airflow through the pillar.

The vehicle body may further include a baffle positioned inside the frame rail behind the air extractor.

The opening may be positioned below the frame rail.

The bed portion may include a wheelwell, and the frame rail may extend above the wheelwell. The air extractor may be positioned behind the wheelwell.

The vehicle body may further include a body panel fixed relative to the frame rail and concealing the air extractor.

The pillar and the frame rail may be sealed along the airflow path from the opening to the air extractor.

The cabin portion and the bed portion may constitute a unibody frame of a vehicle.

The air extractor may include a plurality of flaps movable between an open position and a closed position. Airflow from the frame rail to the ambient environment may tend to move the flaps to the open position, and airflow from the ambient environment to the frame rail may tend to move the flaps to the closed position.

The bed portion may include a bed floor, and the frame rail may be positioned above and spaced from the bed floor.

The frame rail may be welded to the pillar.

The frame rail and the pillar may be structural components of the vehicle body.

With reference to the Figures, a vehicle body 32 for a vehicle 30 includes a cabin portion 34, a bed portion 36, and an air extractor 38. The cabin portion 34 defines a passenger cabin 40 and includes a hollow pillar 42 having a first opening 44 to the passenger cabin 40. The bed portion 36 defines a bed 46 and includes a hollow first frame rail 48 elongated from the pillar 42. The pillar 42 and the first frame rail 48 define an airflow path P from the first opening 44. The air extractor 38 is positioned in the first frame rail 48 and is in communication with the airflow path P and an ambient environment.

By providing air extraction through the vehicle body 32, the vehicle body 32 makes packaging components of the vehicle 30 easier by routing airflow through already existing components. The airflow path P is easy to seal, which can prevent backflow into the passenger cabin 40. The arrangement of the airflow is also easy to adjust during the design phase to reduce noise, vibration, and harshness (NVH).

With reference to FIG. 1, the vehicle 30 may be any passenger or commercial automobile such as a car, a truck, a sport utility vehicle, a crossover, a van, a minivan, a taxi, a bus, etc. In particular, the vehicle 30 can be a pickup truck as shown. A pickup truck is a light-duty truck for which the passenger cabin 40 is enclosed and the bed 46 is an open cargo area.

The vehicle 30 includes the passenger cabin 40 to house occupants, if any, of the vehicle 30. The passenger cabin 40 includes one or more front seats disposed at a front of the passenger cabin 40 and possibly one or more back seats disposed behind the front seats (not shown).

Figure 2:
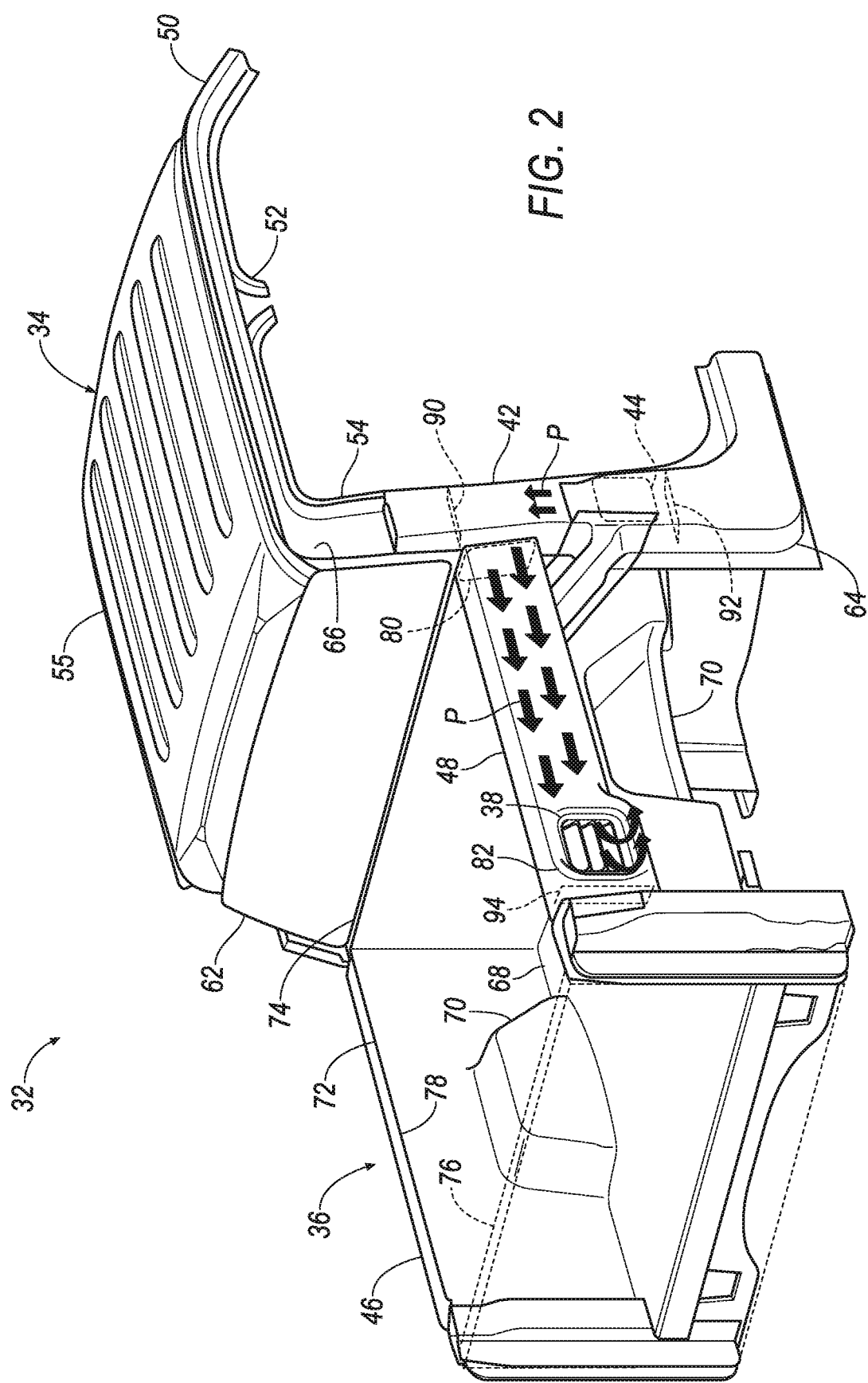
FIG. 2 is a rear perspective view of a portion of a vehicle body of the vehicle.

The vehicle 30 includes the vehicle body 32. The vehicle 30 is of a unibody construction, as shown in FIG. 2, in which the vehicle body 32 and a frame of the vehicle 30 are a single component. The vehicle body 32 is the main supporting structure of the vehicle 30, to which other components are directly or indirectly attached. The vehicle body 32 may be formed of any suitable material, for example, aluminum, steel, etc. Alternatively, the vehicle 30 may be of a body-on-frame construction, in which the frame supports the vehicle body 32 that is a separate component from the frame.

The cabin portion 34 of the vehicle body 32 defines the passenger cabin 40, e.g., extends around and encloses the passenger cabin 40. The cabin portion 34 includes A pillars 50, B pillars 52, possibly C pillars 54, and a roof 55 or roof rails. The A pillars 50 extend between a windshield 56 and windows 58. The B pillars 52 extend between the windows 58 of adjacent doors 60 if the vehicle 30 has four doors 60 or between the windows 58 and a backlite 62 if the vehicle 30 has two doors 60. If present, the C pillars 54 extend between the windows 58 and the backlite 62. The roof 55 extends along the windows 58 from the A pillar 50 to the B pillar 52 to the C pillar 54.

The pillar 42 that has the first opening 44 and partially defines the airflow path P is one of the B pillars 52 or C pillars 54, whichever is rearmost of the cabin portion 34. The pillar 42 is included in the cabin portion 34. The pillar 42 partially constitutes a doorjamb for one of the doors 60. The pillar 42 is hollow, i.e., has an elongated tubular shape. The pillar 42 is elongated mostly vertically from a bottom end 64 to a top end 66. The pillar 42 is a structural component of the vehicle body 32, i.e., forms a path for transmitting forces from one region of the vehicle body 32 to another region of the vehicle body 32.

The pillar 42 includes the first opening 44 to the passenger cabin 40. The first opening 44 is a hole through a wall of the pillar 42 leading from the passenger cabin 40 to a space that is internal to the pillar 42 and that is defined by the tubular shape of the pillar 42. The first opening 44 can be partially occupied by a vehicle component such as a seatbelt retractor (not shown). The first opening 44 is positioned in a lower half of the pillar 42, i.e., closer to the bottom end 64 than to the top end 66 of the pillar 42. The first opening 44 is positioned below the first frame rail 48, i.e., lower along a vertical axis defined by the vehicle 30 than the frame rail.

The bed portion 36 defines the bed 46, i.e., an open cargo area. The bed portion 36 includes a bed floor 68, two wheelwells 70, two side walls 72, a front wall 74, and a tailgate 76. The bed floor 68 is arranged horizontally, and the side walls 72 and the front wall 74 extend vertically from the bed floor 68. The front wall 74 may constitute a rear wall of the passenger cabin 40 and may include the backlite 62. The wheelwells 70 each extend from the bed floor 68 to one of the side walls 72. The wheelwells 70 extend upward from the bed floor 68 and inboard from the side walls 72. The tailgate 76 is movable between a lowered positioned substantially forming a horizontal plane with the bed floor 68 and a latched position extending vertically from the bed floor 68.

Figure 3:
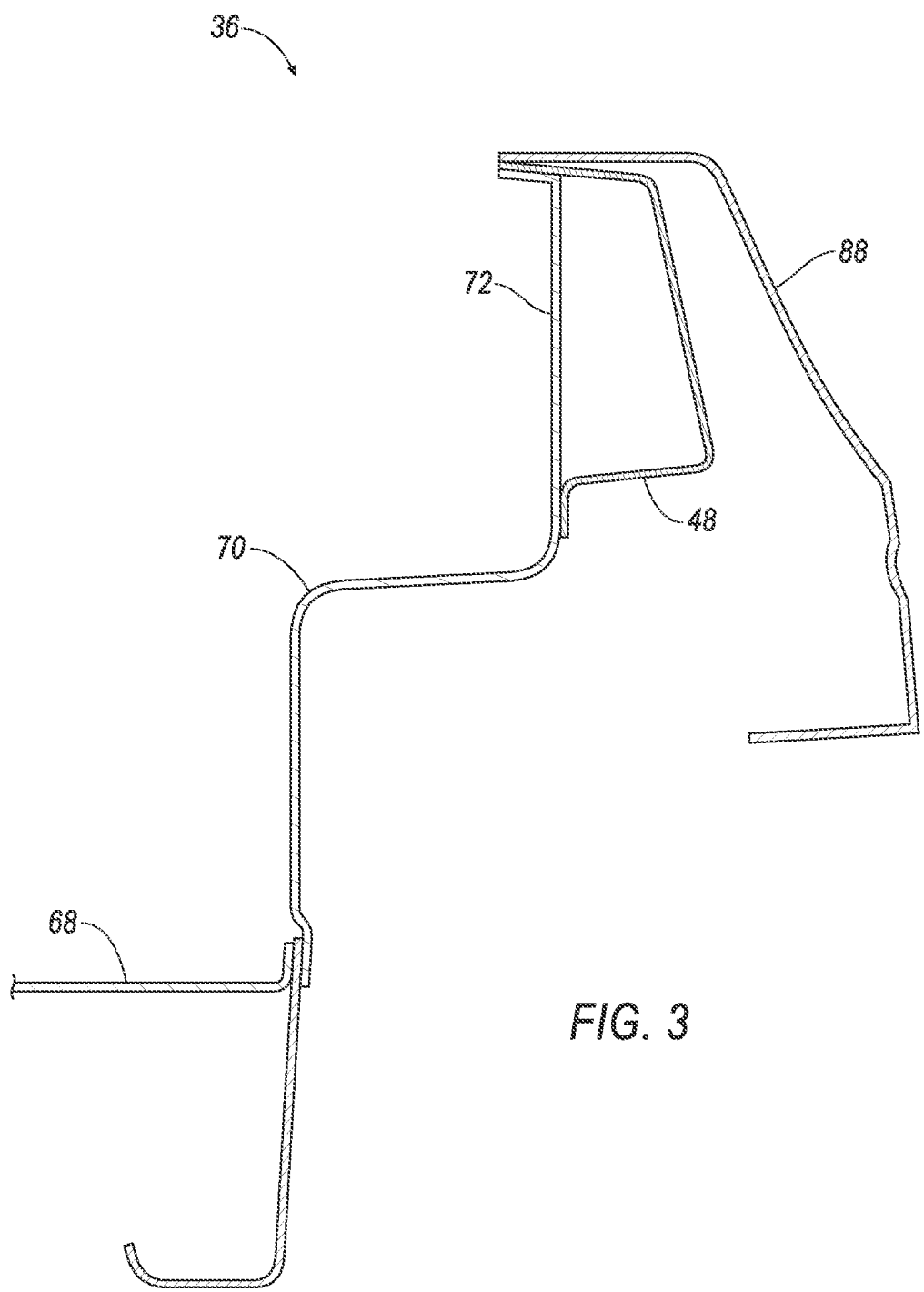
FIG. 3 is a cross-sectional view of a bed portion of the vehicle body.

With reference to FIGS. 2 and 3, the bed portion 36 includes the first frame rail 48 and a second frame rail 78. The frame rails 48, 78 are elongated horizontally at a top of the respective side walls 72 and extend above the respective wheelwells 70. The frame rails 48, 78 are positioned above and spaced from the bed floor 68. The frame rails 48, 78 are elongated horizontally rearward from the C pillars 54 (or from the B pillars 52 if the vehicle 30 lacks C pillars 54). The frame rails 48, 78 are structural components of the vehicle body 32, i.e., form paths for transmitting forces from one region of the vehicle body 32 to another region of the vehicle body 32.

The first frame rail 48 is elongated horizontally rearward from the pillar 42. The first frame rail 48 is spaced from the bottom end 64 and from the top end 66 of the pillar 42. The first frame rail 48 is hollow, i.e., has an elongated tubular shape. The first frame rail 48 is directly connected to the pillar 42. For example, the first frame rail 48 can be welded to the pillar 42. The pillar 42 includes a second opening 80 leading from an inside of the pillar 42 to an inside of the first frame rail 48. The first frame rail 48 may be, e.g., welded around the second opening 80. The second opening 80 permits air to flow between inside the pillar 42 and inside the first frame rail 48. The first frame rail 48 partially constitutes the airflow path P along with the pillar 42.

With reference to FIG. 2, the air extractor 38 is positioned in the first frame rail 48. For example, the first frame rail 48 can include a third opening 82, and the air extractor 38 can fill the third opening 82. The air extractor 38 can be positioned behind the wheelwells 70, i.e., farther from the pillar 42 in a longitudinal direction than the wheelwell 70 that is below the first frame rail 48. The air extractor 38 leads from inside the first frame rail 48 to outside the first frame rail 48.

Figure 4:
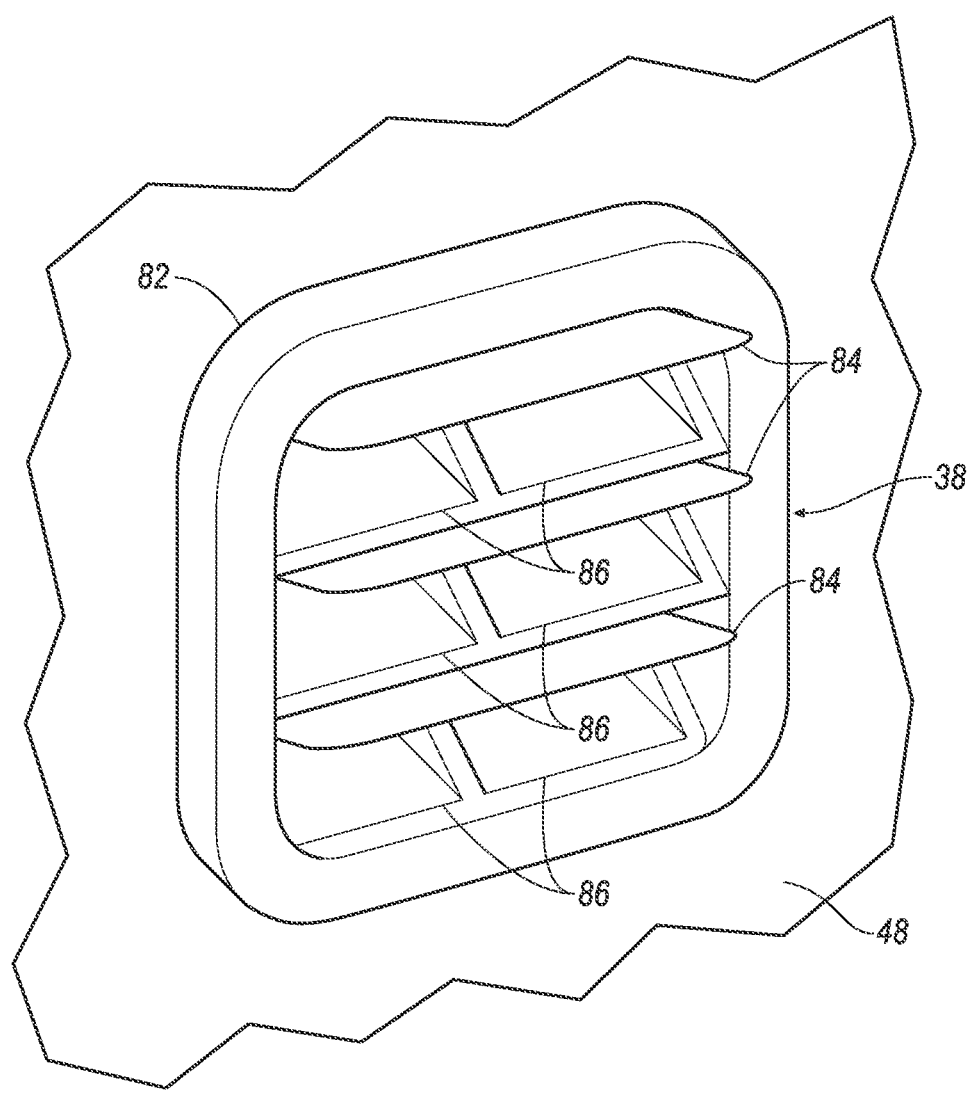
FIG. 4 is a perspective view of an air extractor in an open position.

With reference to FIGS. 2 and 4, the air extractor 38 is in communication with the airflow path P and the ambient environment. The air extractor 38 permits air to leave the first frame rail 48 through the third opening 82 and blocks air from entering the first frame rail 48 through the third opening 82. In other words, the air extractor 38 constitutes a one-way gate for airflow. For example, the air extractor 38 includes a plurality of flaps 84 movable between an open position and a closed position. The flaps 84 are positioned on top of a plurality of holes 86, and the flaps 84 are larger than the holes 86, meaning the flaps 84 cannot move into the holes 86. The flaps 84 in the closed position seal the holes 86, as shown in FIG. 2, and the flaps 84 in the open position are spaced from the holes 86, as shown in FIG. 4. The flaps 84 are arranged so that airflow from the first frame rail 48 to the ambient environment tends to move the flaps 84 to the open position, and airflow from the ambient environment to the first frame rail 48 tends to move the flaps 84 to the closed position.

With reference to FIG. 3, a body panel 88 is fixed relative to the first frame rail 48. The body panel 88 can constitute an outboard side of one of the side walls 72. The body panel 88 is positioned to conceal the air extractor 38. The body panel 88 is not sealed over the air extractor 38, i.e., air moving through the air extractor 38 can flow around the body panel 88 to the ambient environment.

Figure 5:
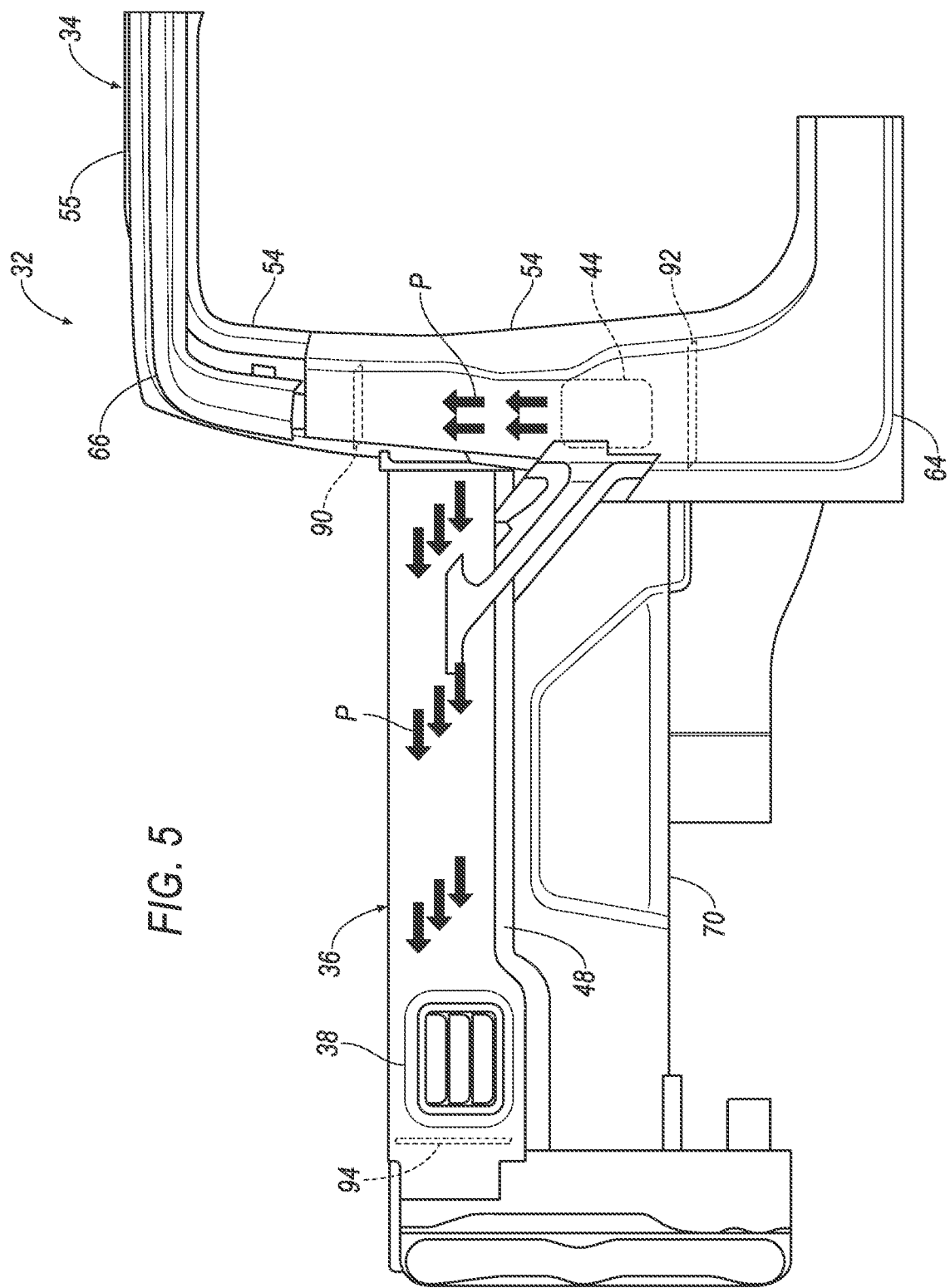
FIG. 5 is a side view of a portion of the vehicle body.

With reference to FIG. 5, the vehicle body 32 includes a first baffle 90, a second baffle 92, and a third baffle 94. The first baffle 90 is positioned inside the pillar 42 on an opposite side of the second opening 80 and first frame rail 48 from the first opening 44, i.e., above the second opening 80 and first frame rail 48 when the first opening 44 is below the first frame rail 48. The second baffle 92 is positioned inside the pillar 42 so that the first opening 44 is between the first baffle 90 and the second baffle 92, i.e., on an opposite side of the first opening 44 than the first baffle 90, i.e., below the first opening 44. The third baffle 94 is positioned inside the first frame rail 48 behind the air extractor 38, i.e., farther from the pillar 42 than the air extractor 38.

The baffles 90, 92, 94 are arranged to block airflow through the pillar 42 or first frame rail 48. The first baffle 90 and second baffle 92 are each arranged to block airflow through the pillar 42, and the third baffle 94 is arranged to block airflow through the first frame rail 48. For example, the baffles 90, 92, 94 may have shapes corresponding to cross-sections of the pillar 42 or first frame rail 48, and the baffles 90, 92, 94 may be positioned in the pillar 42 or first frame rail 48 to form a seal with the pillar 42 or first frame rail 48. The baffles 90, 92, 94 may be attached to the pillar 42 or first frame rail 48 with, e.g., mastic. The baffles 90, 92, 94 may be the same material as the pillar 42 and first frame rail 48, e.g., steel, aluminum, etc.

The pillar 42 and the first frame rail 48 define the airflow path P from the first opening 44 to the air extractor 38. The pillar 42 and the first frame rail 48 are sealed along the airflow path P from the first opening 44 to the air extractor 38, i.e., air is prevented from leaking out at points between the first opening 44 and the air extractor 38. The first baffle 90 prevents air from traveling upward in the pillar 42 past the second opening 80 to the first frame rail 48. The second baffle 92 prevents air from traveling downward in the pillar 42 from the first opening 44 away from the second opening 80. The third baffle 94 prevents air from traveling past the air extractor 38 in the first frame rail 48.

Air flows along the airflow path P when the air pressure in the passenger cabin 40 suddenly increases, e.g., when one of the doors 60 is closed, or when the air pressure in the passenger cabin 40 otherwise increases above a certain level. The air enters the first opening 44, travels through the pillar 42 from the first opening 44 to the second opening 80 while being blocked on either end by the first baffle 90 and second baffle 92, travels through the first frame rail 48 from the second opening 80 to the air extractor 38, is blocked from traveling past the air extractor 38 by the third baffle 94, and exits through the air extractor 38 to the ambient environment.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A vehicle body comprising:
    a cabin portion defining a passenger cabin and including a hollow pillar having an opening to the passenger cabin;
    a bed portion defining a bed and including a hollow frame rail elongated from the pillar, wherein the pillar and the frame rail define an airflow path from the opening; and
    an air extractor positioned in the frame rail and in communication with the airflow path and an ambient environment.

2. The vehicle body of claim 1, wherein the frame rail is elongated horizontally rearward from the pillar.

3. The vehicle body of claim 1, wherein the pillar is elongated from a bottom end to a top end, and the frame rail is spaced from the bottom end and from the top end.

4. The vehicle body of claim 1, further comprising a baffle positioned inside the pillar on an opposite side of the frame rail from the opening.

5. The vehicle body of claim 4, wherein the baffle is arranged to block airflow through the pillar.

6. The vehicle body of claim 4, wherein the baffle is a first baffle, the vehicle body further comprising a second baffle positioned inside the pillar, wherein the opening is between the first baffle and the second baffle.

7. The vehicle body of claim 6, wherein the first baffle and the second baffle are each arranged to block airflow through the pillar.

8. The vehicle body of claim 1, further comprising a baffle positioned inside the frame rail behind the air extractor.

9. The vehicle body of claim 1, wherein the opening is positioned below the frame rail.

10. The vehicle body of claim 1, wherein the bed portion includes a wheelwell, and the frame rail extends above the wheelwell.

11. The vehicle body of claim 10, wherein the air extractor is positioned behind the wheelwell.

12. The vehicle body of claim 1, further comprising a body panel fixed relative to the frame rail and concealing the air extractor.

13. The vehicle body of claim 1, wherein the pillar and the frame rail are sealed along the airflow path from the opening to the air extractor.

14. The vehicle body of claim 1, wherein the cabin portion and the bed portion constitute a unibody frame of a vehicle.

15. The vehicle body of claim 1, wherein the air extractor includes a plurality of flaps movable between an open position and a closed position.

16. The vehicle body of claim 15, wherein airflow from the frame rail to the ambient environment tends to move the flaps to the open position, and airflow from the ambient environment to the frame rail tends to move the flaps to the closed position.

17. The vehicle body of claim 1, wherein the bed portion includes a bed floor, and the frame rail is positioned above and spaced from the bed floor.

18. The vehicle body of claim 1, wherein the frame rail is welded to the pillar.

19. The vehicle body of claim 1, wherein the frame rail and the pillar are structural components of the vehicle body.

* * * * *